2,978,483
NITRAZA DINITRILE COMPOSITIONS OF MATTER

Clinton R. Vanneman, Claremont, and Karl Klager, Monrovia, Calif., assignors to Aerojet-General Corporation, Azusa, Calif., a corporation of Ohio No Drawing. Filed Sept. 6, 1955, Ser. No. 532,730

15 Claims. (Cl. 260—465.5)

This invention relates to new compositions of matter and the method for their preparation. In particular, it relates to nitraza dinitriles having the general formula:

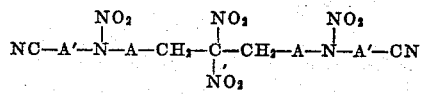

wherein A and A' are lower alkylene radicals.

The dinitriles of this invention undergo hydrolysis in the presence of a mineral acid to form their corresponding nitraza acids as disclosed in our copending application No. 532,731, filed concurrently with the present application. The acids thus obtained can be converted to their corresponding diisocyanate derivatives by the method disclosed in our copending application Serial No. 451,707, filed August 23, 1954, now abandoned.

The diisocyanates thus obtained react with polyalcohols, such as ethylene glycol and 3,3-dinitro-1,5-pentanediol, in the presence of a catalyst such as boron trifluoride, to yield high molecular weight polyurethane compositions useful as solid propellants, according to the method disclosed in assignee's copending application Serial No. 422,649, filed April 12, 1954, now abandoned. The polyurethanes can be cast or pressed into a suitable shape, usually a cylinder, and placed in a conventional rocket chamber. To produce thrust for propulsion, the propellant is simply ignited whereby large quantities of gases are produced which impart forward thrust to the rocket upon exhaustion. The propellant can be ignited by any conventional igniter, as for example the igniter disclosed in assignee's copending application Serial No. 306,030, filed August 23, 1952.

The nitraza dinitriles of this invention are prepared by reacting a geminal dinitro diaza compound with nitric acid in accordance with the general reaction scheme set forth below:

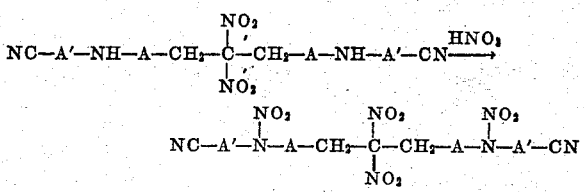

wherein A and A' are lower alkylene radicals.

The starting materials for this invention are prepared by condensing acrylonitrile with a geminal dinitro diamine, as disclosed in our copending application No. 439,467, filed June 25, 1954, now abandoned. The length of the carbon chain, A', contributed by the acrylonitrile to the condensation product may be either lengthened or shortened by conventional methods. Because the nitraza groups exhibit greater stability than the secondary amine groups, the condensation product is preferably nitrated prior to lengthening alkylene radical A'. The alkylene radical A' is conveniently extended by hydrolyzing the nitrile group to the carboxyl group, the silver salt of which is then reacted with bromine to produce the nitraza alkyl halide which in turn is reacted with cyanoacetic esters to produce the homologous nitrile. Conversely, the carbon chain may be shortened by converting the acid obtained by hydrolysis to the acid halide, reacting the halide with sodium azide to form the amine, reacting the amine with sodium nitrite to form the alcohol, and subsequently forming the lower homologue of the carboxylic acid by oxidation. The resulting acid is then again converted to the acid halide which is reacted with sodium azide and sodium nitrite to form the alcohol and subsequently forming the lower homologue of the carboxylic acid by oxidation. The resulting acid is then again converted to the acid halide which is reacted with sodium azide and sodium nitrate to form the alcohol and subsequently the halide, which is reacted with sodium cyanide to produce the lower homologous geminal dinitro dinitraza-dinitrile.

To more clearly illustrate this invention, the following examples are presented. It is to be understood, however, that these examples are presented merely as a means of illustration and are not intended to limit the scope of the invention in any way.

EXAMPLE I

*Preparation of 4,7,7,10-tetranitro-4,10-diaza-1,13-tridecane dinitrile*

A solution of 93 gm. (0.312 mole) 7,7-dinitro-4,10-diaza-1,13-tridecane dinitrile in 500 ml. acetone was thoroughly chilled in a dry ice-acetone bath, and 43 ml. (0.69 mole) 70% nitric acid was added dropwise with stirring and cooling. The precipitate was separated by filtration and washed with ether. The product was dried in a vacuum desiccator over phosphorous pentoxide. Anhydrous nitric acid (42 ml., 1 mole) was added dropwise with stirring to 294 ml. (3 mole) acetic anhydride, maintained at a temperature of −5° C. Acetyl chloride (8.4 ml., 1.12 mole) was added, followed by the rapid addition (ca. 5 minutes) of 127 gm. (0.3 mole) 7,7-dinitro-4,10-diaza-1,13-tridecane dinitrile bis-nitric acid salt. The resulting mixture was allowed to warm to a temperature of 20° C., during a 15 minute period of continuous stirring. While maintaining the temperature at 18–20° C., stirring was continued for 1 hour. The slurry was poured onto 2.5 kg. of an ice-water mixture. The product was separated by filtration and washed successively with water, methanol, and ether. After drying in a vacuum desiccator over phosphorous pentoxide, the product weighed 102.7 gm., corresponding to an 88% yield. A sample was purified for analysis by 3 recrystallizations from acetone; the M.P. was 118.5–119° C. The elemental analysis of the product was as follows:

Calculated for $C_{11}H_{16}O_8N_8$: percent C, 34.02; percent H 4.15; percent N, 28.86. Found: percent C, 34.61; percent H. 4.13; percent N, 28.29.

The particular temperatures and proportions employed in the above example are not critical in the practice of this invention. Other proportions can be used and higher or lower temperatures can be employed if desired. Lower temperatures require longer reaction times while higher temperatures increase the reaction rate and tend to make the reaction more difficult to control.

Fuming nitric acid as well as mixtures of nitric acid and sulfuric acid can be used in place of nitric acid to effect the nitration.

Any member of the disclosed class of dinitriles can be prepared simply by selecting an appropriate diaza dinitrile compound and nitrating it in the manner set forth in Example I. For example, 4,8,8,12-tetranitro-4,12-diaza-1,15-pentadecane dinitrile is prepared by nitrating 8,8-dinitro-4,12-diaza-1,14-pentadecane dinitrile; 4,8,8,13-tetranitro-4,13-diaza-1,16-hexadecane dinitrile is prepared by nitrating 8,8-dinitro-4,13-diaza-1,16-hexadecane dinitrile; 5,9,9,13-tetranitro-5,13-diaza-1,17-heptadecane dinitrile is prepared by nitrating 9,9-dinitro-5,13-diaza-1,17-heptadecane dinitrile; 4,7,7,11-tetranitro-4,11-diaza-1,15-pentadecane dinitrile is prepared by nitrating 7,7-dinitro-4,11-diaza-1,15-pentadecane dinitrile; and 4,9,9,14-tetranitro-4,14-diaza-1,17-heptadecane dinitrile is prepared by nitrating 9,9-dinitro-4,14-diaza-1,17-heptadecane dinitrile.

This application is a continuation-in-part of our co-pending application No. 439,468, filed June 25, 1954, now abandoned.

We claim:

1. As compositions of matter, the dinitro-dinitraza dinitriles having the general formula:

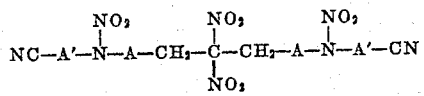

wherein A and A' are lower alkylene radicals.

2. As a composition of matter, 4,7,7,10-tetranitro-4,10-diaza-1,13-tridecane dinitrile having the structural formula:

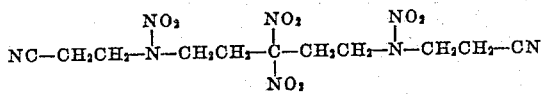

3. As a composition of matter, 4,8,8,12-tetranitro-4,12-diaza-1,15-pentadecane dinitrile having the structural formula:

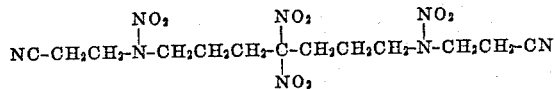

4. As a composition of matter, 4,8,8,13-tetranitro-4,13-diaza-1,16-hexadecane dinitrile having the structural formula:

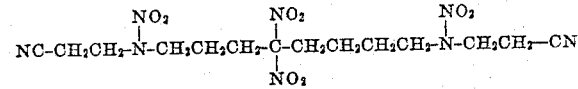

5. As a composition of matter, 5,9,9,13-tetranitro-5,13-diaza-1,17-heptadecane dinitrile having the structural formula:

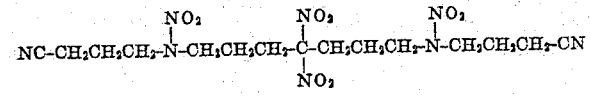

6. As a composition of matter, 4,7,7,11-tetranitro-4,11-diaza-1,15-pentadecane dinitrile having the structural formula:

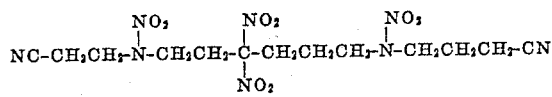

7. As a composition of matter, 4,9,9,14-tetranitro-4,14-diaza-1,17-heptadecane dinitrile having the structural formula:

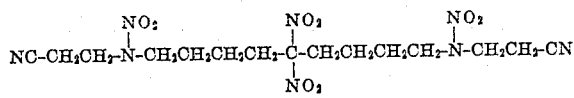

8. The method of preparing dinitro-dinitraza dinitriles having the general formula:

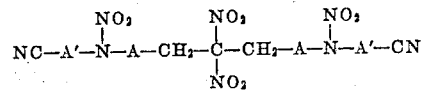

which comprises nitrating a dinitro-diaza dinitrile having the general formula:

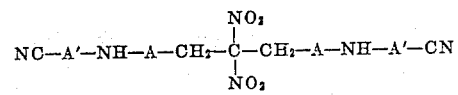

wherein A and A' are lower alkylene radicals.

9. The method of preparing 4,7,7,10-tetranitro-4,10-diaza-1,13-tridecane dinitrile which comprises nitrating 7,7-dinitro-4,10-diaza-1,13-tridecane dinitrile.

10. The method of preparing 4,7,7,10-tetranitro-4,10-diaza-1,13-tridecane dinitrile which comprises reacting 7,7-dinitro-4,10-diaza-1,13-tridecane dinitrile with nitric acid.

11. The method of preparing 4,8,8,12-tetranitro-4,12-diaza-1,15-pentadecane dinitrile which comprises nitrating 8,8-dinitro-4,12-diaza-1,4-pentadecane dinitrile.

12. The method of preparing 4,8,8,13-tetranitro-4,13-diaza-1,16-hexadecane dinitrile which comprises nitrating 8,8-dinitro-4,13-diaza-1,16-hexadecane dinitrile.

13. The method of preparing 5,9,9,13-tetranitro-5,13-diaza-1,17-heptadecane dinitrile which comprises nitrating 9,9-dinitro-5,13-diaza-1,17-heptadecane dinitrile.

14. The method of preparing 4,7,7,11-tetranitro-4,11-diaza-1,15-pentadecane dinitrile which comprises nitrating 7,7-dinitro-4,11-diaza-1,15-pentadecane dinitrile.

15. The method of preparing 4,9,9,14-tetranitro-4,14-diaza-1,17-heptadecane dinitrile which comprises nitrating 9,9-dinitro-4,14-diaza-1,17-heptadecane dinitrile.

References Cited in the file of this patent

Weygand: Organic Preparations, Interscience Publishing Co. Inc., New York (1945), pp. 280–284.